(12) United States Patent
Edelmann et al.

(10) Patent No.: US 7,066,648 B2
(45) Date of Patent: Jun. 27, 2006

(54) BEARING ARRANGEMENT

(75) Inventors: Ludwig Edelmann, Sulzthal (DE); Doreen Wiesenau, Schwebheim (DE)

(73) Assignee: AB SKF, Goteborg (SE)

( * ) Notice: Subject to any disclaimer, the term of this patent is extended or adjusted under 35 U.S.C. 154(b) by 159 days.

(21) Appl. No.: 10/792,858

(22) Filed: Mar. 5, 2004

(65) Prior Publication Data

US 2004/0228550 A1    Nov. 18, 2004

(30) Foreign Application Priority Data

Mar. 6, 2003   (DE) .............................. 103 09 736

(51) Int. Cl.
*F16C 33/66* (2006.01)
*F16N 27/00* (2006.01)
(52) U.S. Cl. .................. 384/13; 184/105.1; 384/322; 384/462
(58) Field of Classification Search ............ 384/13, 384/322, 462; 401/132; 222/92, 94, 209, 222/541.4, 541.6; 184/5, 5.1, 100, 105.1, 184/109
See application file for complete search history.

(56) References Cited

U.S. PATENT DOCUMENTS

| 3,329,179 | A | * | 7/1967 | Abel ........................... 184/109 |
| 4,522,622 | A | * | 6/1985 | Peery et al. .................. 222/94 |
| 4,778,285 | A | * | 10/1988 | Larson ....................... 384/322 |
| 5,141,340 | A | * | 8/1992 | Van Tonder ................ 384/462 |
| 6,019,196 | A | * | 2/2000 | Selby et al. ................. 184/1.5 |
| 6,125,968 | A | * | 10/2000 | Shirai ............................ 184/5 |
| 6,450,690 | B1 | * | 9/2002 | Dischler ..................... 384/462 |

FOREIGN PATENT DOCUMENTS

| DE | 26 18 536 | 11/1978 |
| DE | 28 48 813 C2 | 10/1981 |
| DE | 28 48 814 C2 | 12/1981 |

* cited by examiner

*Primary Examiner*—Thomas R. Hannon
(74) *Attorney, Agent, or Firm*—Buchanan Ingersoll

(57) ABSTRACT

A bearing arrangement is provided with an area to be supplied with lubricant from a lubricant reservoir via a lubricant line. The lubricant reservoir has a number of individual reservoirs in which a portioned amount of lubricant is contained with closure to the lubricant line. A mechanism is provided for allowing the closure to the lubricant line to be optionally cleared.

20 Claims, 2 Drawing Sheets

BEARING ARRANGEMENT

This application is based on and claims priority under 35 U.S.C. § 119 with respect to German Application No. 103 09 736.8 filed on Mar. 6, 2003, the entire content of which is incorporated herein by reference.

FIELD OF THE INVENTION

The invention relates to a bearing arrangement in which an area which is to be supplied with lubricant is connected to a lubricant reservoir via a lubricant line.

BACKGROUND OF THE INVENTION

A bearing arrangement is known from German Patentschrift No. DE 28 48 813 C2. This document describes a universal joint, with a journal spider which connects the yoke arms of two joint yokes. On the journal of the spider, bearing bodies are provided which contains rolling bodies or sliding bodies which are held in holes of the yoke arms and are axially fixed. The bearing bodies are sealed relative to the body of the journal yoke via an elastic seal. To facilitate the supply of the bearing point with lubricant, the seal is made as a separate bottom of the bearing bush and the middle part is made as a thin-walled membrane with a reinforced outside edge. The membrane arches to the outside in the radial direction when the bearing bush is pressed in by the pressure of the lubricant which is located beforehand in the bearing bush so that the lubricant supply is under preliminary tension.

With this configuration, lubricant is continuously pressed into the universal joint bearing in small amounts. Thus, the bearings are supplied with a sufficient amount of lubricant over the entire running time.

Similar approaches are known from German Patentschrift No. DE 28 48 814 C2 and German Patentschrift No. DE 26 18 536 C2.

In many cases, this known concept is not sufficient for lubrication of a bearing point. Generally speaking, new lubricant must be supplied at fixed intervals to the bearing point in order to ensure optimum conditions for the operation of the bearing. Therefore, at fixed maintenance intervals, lubricant is generally delivered via the lubrication nipple to the bearing point by a grease gun or the like. This constitutes not only a considerable maintenance effort, but moreover entails the danger that upon relubrication too much or too little lubricant will be brought to the bearing point.

SUMMARY OF THE INVENTION

According to one aspect of the invention, a bearing arrangement comprises an area which is to be supplied with lubricant, with the area being connected to a lubricant reservoir via a lubricant line. The lubricant reservoir comprises a number of individual reservoirs each containing a portioned amount of lubricant with closure to the lubricant line. Means are provided for selectively clearing the closure to the lubricant line to introduce lubricant in each of the individual reservoirs to the lubricant line.

The bearing arrangement provides a relatively simple arrangement for undertaking relubrication of a bearing arrangement, while at the same time reducing or avoiding the possibility that too much or too little lubricant is delivered.

The means for selectively clearing the closure to the lubricant line is preferably provided by a film or foil which can be perforated by applying an external pressure in the area of the lubricant line which borders the individual reservoir. The film or foil can have a weakened region or point such as a thinned area or point which breaks or ruptures when external pressure is applied.

An especially simple manageability of a bearing arrangement which can be relubricated is achieved when the external pressure applied to the individual reservoir is produced manually by hand.

It is also possible to provide the individual reservoirs with markings, such as inscriptions which correspond to the operating time of the bearing arrangement.

The proposed construction of a bearing arrangement can preferably be used in connection with roller-supported linear bearing units. These units can have a return for the rolling bodies, in which case the lubricant line can be positioned to discharge into the area of the return. Also, the lubricant reservoir can be preferably located in the area of the return.

An operation of the lubricant reservoir which is made easy because it is clear is accomplished when the individual reservoirs are located laterally next to one another. Furthermore the functionality of the bearing arrangement can be relatively significantly increased by the lubricant reservoir being made interchangeable or removable.

According to another aspect of the invention, a bearing arrangement comprises a pair of rails between which is located a plurality of rolling bodies, a lubricant line connected to an area to which is to be supplied lubricant, and a lubricant reservoir mounted on one of the rails. The lubricant reservoir comprises a plurality of separated individual reservoirs each containing an amount of lubricant, with each of the individual reservoirs being closed to the lubricant line and being adapted to communicate with the lubricant line upon application of an external force to the lubricant reservoir to introduce lubricant in the individual reservoir to the lubricant line for supply to the area to which is to be supplied lubricant.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION

Figure 1:
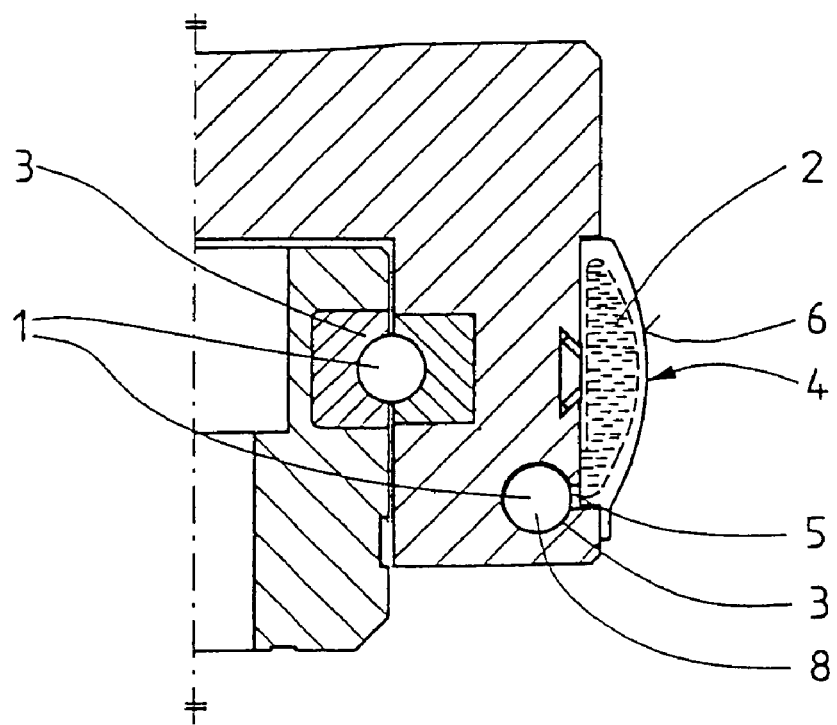
FIG. 1 is a cross-sectional view of a bearing arrangement of a linear bearing unit according to one possible embodiment of the present invention.

Referring initially to FIG. 1, one form of a bearing arrangement 1 is illustrated. In this illustrated embodiment, the bearing arrangement is in the from of a linear bearing unit with balls. The balls are guided in the load area between two guide rails and are deflected on two axial ends in order to be returned by way of a return 8.

The bearing arrangement 1 includes an area 3 which is to be supplied with lubricant 2. The lubricant is preferably intended to be delivered to the area 3 at fixed maintenance intervals to maintain the serviceability of the bearing arrangement. For this purpose, there is provided a lubricant reservoir 4 from which a lubricant line 5 leads to the area 3 which is to be supplied with the lubricant. In the illustrated embodiment, the lubricant reservoir 4 is separate from the bearing arrangement, but is mounted on or attached to the bearing arrangement. On example of this mounting or attachment of the lubricant reservoir 4 is shown in FIG. 1.

Figure 2:
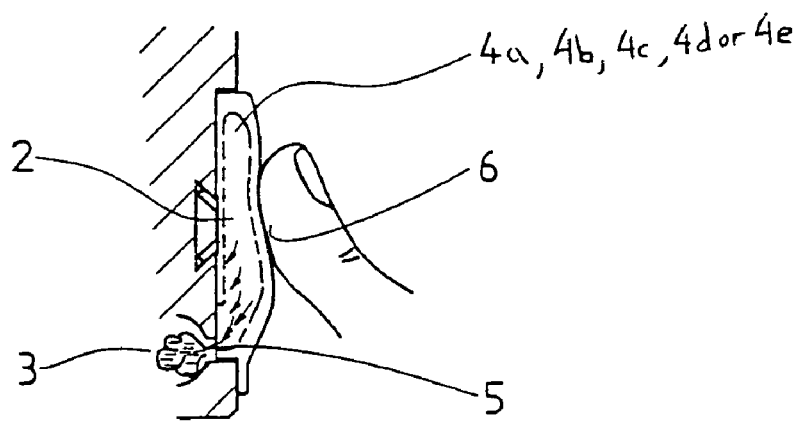
FIG. 2 is a cross-sectional view of a portion of the bearing arrangement shown in FIG. 1 illustrating activation of the individual reservoir with lubricant by applying pressure with a finger.
Figure 3:
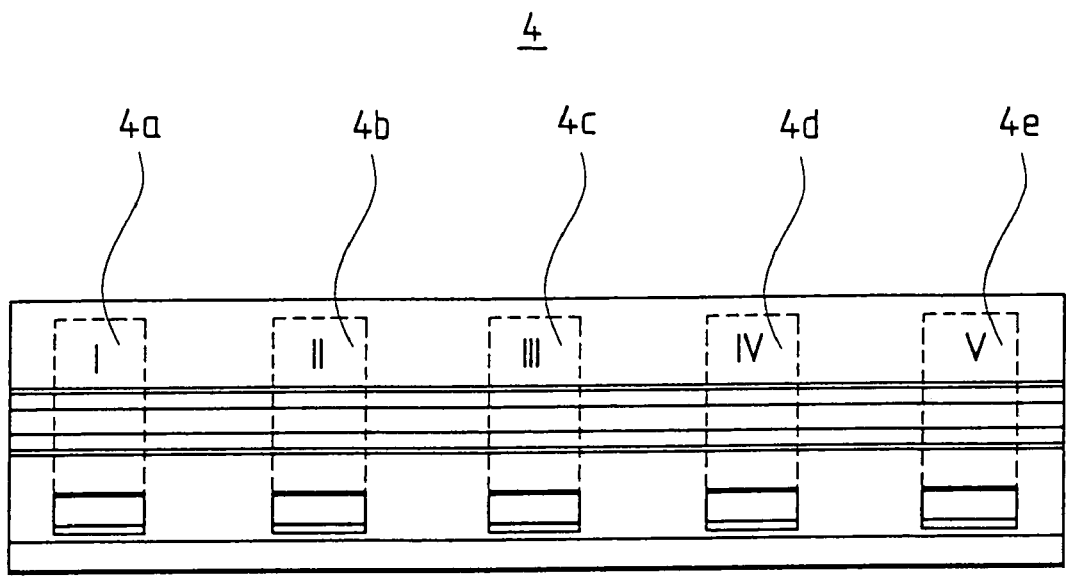
FIG. 3 is a front view of one possible form of a lubricant reservoir for use in connection with a bearing arrangement.
Figure 4:
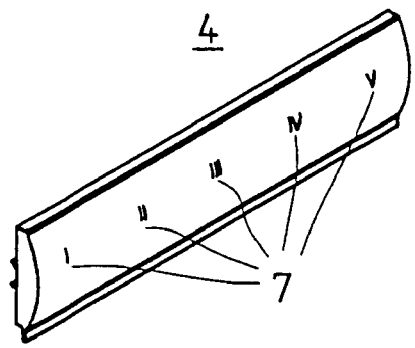
FIG. 4 is a perspective view of a lubricant reservoir before activating the individual reservoirs.
Figure 5:
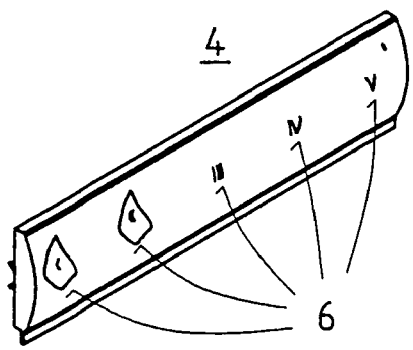
FIG. 5 is a perspective view similar to FIG. 4, illustrating activation of two individual reservoirs.

In the illustrated version, the lubricant reservoir 4 is comprised of a number of individual reservoirs 4a, 4b, 4c, 4d, 4e such as shown in FIGS. 3–5 in which one defined or portioned amount of lubricant at a time is contained, with closure to the lubricant line 5. The individual reservoirs 4a, 4b, 4c, 4d, 4e are separate from one another and arranged generally laterally adjacent each other along the length of the lubricant reservoir. The individual reservoirs 4a, 4b, 4c, 4d, 4e are constructed such that each of them is provided with a mechanism 6 for closing and selectively clearing the lubricant line 5. The mechanism 6 for closure and clearing of the lubricant line is generally designated in FIGS. 1 and 2. These mechanisms 6 can comprise a foil or film which has a weakened point or region which can be in the form of a thinned point or region. The foil or film is thus designed such that when pressure is applied to the individual reservoir 4a, 4b, 4c, 4d, 4e, rupture or perforation takes place, thus causing the lubricant 2 to travel from the individual reservoirs into the lubricant line 5 and thus to the area 3 which is to be supplied with lubricant.

FIG. 2 illustrates how activation of an individual reservoir of the lubricant reservoir 4 can be carried out. An external pressure is applied to a individual reservoir of the lubricant reservoir 4, for example by pressing on the individual reservoir with a finger. This results in a rupture of the foil or film 6 at the thinned spot or weakened region in the area of the lubricant line 5 as shown in FIG. 2 so that the lubricant 2 travels into the area 3 which is to be supplied with lubricant as schematically shown in FIG. 2.

FIGS. 3–5 illustrate that the lubricant reservoir 4 can have five individual reservoirs 4a, 4b, 4c, 4d, 4e, each containing a defined or predetermined amount of lubricant 2. As illustrated, each of the individual reservoirs can be provided with markings 7, with the markings 7 corresponding to a due maintenance time. For example, the markings 7 can consist of imprinted time information (e.g., an operating time of the bearing arrangement) so that when the respective time is reached, an individual reservoir is activated by applying pressure to the individual reservoir as depicted in FIG. 2.

FIG. 5 depicts a lubricant reservoir 4 in which two of the individual reservoirs have been activated (i.e., pressed) while the other three individual reservoirs are still available for later relubrication.

As generally illustrated in FIG. 1, it has been found effective in linear bearings to place the lubricant reservoir 4 in the vicinity of the return 8 for the rolling bodies and to introduce the lubricant there.

It is also advantageous if the lubricant reservoir 4 is made interchangeable or removable. This means that after all individual reservoirs are exhausted, a new lubricant reservoir 4 can be mounted after the old one is removed so that the bearing arrangement is equipped for further relubrication.

With the bearing arrangement according to the embodiment described above, special knowledge by the individual maintaining the bearing arrangement is not necessary for maintenance, particularly with respect to the question of how much lubricant should be supplied to the bearing point. The required amount of lubricant per maintenance cycle is made available and supplied to the bearing by the portioning of the amount of lubricant in the individual reservoirs.

Also, the maintenance of the bearing can be managed relatively easily since it is possible to achieve perforation or rupture of the separating foil or film to the bearing point simply by exerting pressure on the individual reservoir with the finger. Thus, maintenance devices at not typically necessary.

In addition, by labeling the individual reservoirs of the lubricant reservoir, it is possible to relatively easily track over time when maintenance was last carried out and when the next one is due.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A bearing arrangement comprising an area which is to be supplied with lubricant, the area being connected to a lubricant reservoir via a lubricant line, the lubricant reservoir comprising a number of individual reservoirs each containing a portioned amount of lubricant to be supplied to said area of the bearing arrangement to be supplied with lubricant with closure to the lubricant line, and means for selectively clearing the closure to the lubricant line to introduce lubricant in each of the individual reservoirs to the lubricant line, wherein the means for selectively clearing the closure to the lubricant line comprises a film or foil adapted to be perforated by manually applying external pressure to the individual reservoirs.

2. The bearing arrangement according to claim 1, wherein the film or foil has at least one weakened point which breaks when external pressure is applied.

3. The bearing arrangement according to claim 1, wherein the individual reservoirs are provided with markings corresponding to an operating time of the bearing arrangement.

4. The bearing arrangement according to claim 3, wherein the bearing arrangement comprises a roller-supported linear bearing unit having a plurality of rolling bodies.

5. The bearing arrangement according to claim 4, wherein the roller-supported linear bearing unit has a return for the rolling bodies.

6. The bearing arrangement according to claim 5, wherein the lubricant line discharges into an area of the return.

7. The bearing arrangement according to claim 6, wherein the lubricant reservoir is located adjacent the return.

8. The bearing arrangement according to claim 7, wherein the individual reservoirs are located laterally next to one another.

9. The bearing arrangement according to claim 8, wherein the lubricant reservoir is removable.

10. The bearing arrangement according to claim 1, wherein the individual reservoirs are provided with markings corresponding to an operating time of the bearing arrangement.

11. The bearing arrangement according to claim 1, wherein the bearing arrangement comprises a roller-supported linear bearing unit having a plurality of rolling bodies and a return for the rolling bodies.

12. The bearing arrangement according to claim 11, wherein the lubricant line discharges into an area adjacent the return, and the lubricant reservoir is located adjacent the return.

13. A bearing arrangement comprising:
a pair of rails between which is located a plurality of rolling bodies;
a lubricant line connected to an area to which is to be supplied lubricant;
a lubricant reservoir mounted on one of the rails, the lubricant reservoir comprising a plurality of separated individual reservoirs each containing an amount of lubricant, each of the individual reservoirs being closed to the lubricant line and being adapted to communicate with the lubricant line upon application of an external force to the lubricant reservoir to introduce lubricant in the individual reservoir to the lubricant line for supply to the area to which is to be supplied lubricant.

14. The bearing arrangement according to claim 13, wherein the individual reservoirs comprise a weakened portion adapted to be perforated by applying external pressure to the individual reservoir.

15. The bearing arrangement according to claim 13, wherein the individual reservoirs comprise a film or foil provided with a weakened portion adapted to be perforated by applying external pressure to the individual reservoir.

16. The bearing arrangement according to claim 13, wherein the individual reservoirs are provided with markings corresponding to an operating time of the bearing arrangement.

17. The bearing arrangement according to claim 13, wherein the bearing arrangement is a roller-supported linear bearing unit provided with a return for the rolling bodies, the lubricant line discharging into an area adjacent the return, and the lubricant reservoir being mounted adjacent the return.

18. The bearing arrangement according to claim 13, wherein the lubricant reservoir is removably mounted on the one rail.

19. A bearing arrangement comprising:
a plurality of rolling bodies;
a lubricant line connected to an area of the bearing arrangement to which is to be supplied lubricant;
a lubricant reservoir forming a part of the bearing assembly and comprising a plurality of individual reservoirs each containing an amount of lubricant that is to be supplied to said area of the bearing arrangement to which is to be supplied the lubricant, the individual reservoirs being closed to the lubricant line and being adapted to communicate with the lubricant line upon application of an external force to the lubricant reservoir to introduce lubricant in the individual reservoir to the lubricant line for supply to the area to which is to be supplied the lubricant.

20. The bearing arrangement according to claim 19, wherein the individual reservoirs are adapted to communicate with the lubricant line upon application of a manually applied external force to the lubricant reservoir.

* * * * *